US012147453B1

(12) United States Patent
Smith et al.

(10) Patent No.: US 12,147,453 B1
(45) Date of Patent: Nov. 19, 2024

(54) APPARATUS AND A METHOD FOR THE GENERATION OF EXPLOITATION DATA

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/409,071

(22) Filed: Jan. 10, 2024

(51) Int. Cl.
*G06F 16/28* (2019.01)
*G06F 16/9032* (2019.01)
*G06F 16/951* (2019.01)
*G06F 16/906* (2019.01)

(52) U.S. Cl.
CPC ...... *G06F 16/287* (2019.01); *G06F 16/90332* (2019.01); *G06F 16/951* (2019.01); *G06F 16/906* (2019.01)

(58) Field of Classification Search
CPC ....... G06F 16/28; G06F 16/287; G06F 16/951
USPC ...................................................... 707/709
See application file for complete search history.

(56) References Cited

U.S. PATENT DOCUMENTS

| 11,863,676 | B1 * | 1/2024 | Richter | ................ | H04L 9/3297 |
| 2014/0180943 | A1 * | 6/2014 | Priddy, Jr. | .......... | G06Q 10/1053 |
| | | | | | 705/319 |
| 2019/0197478 | A1 * | 6/2019 | Ferreira Moreno | ......................... | |
| | | | | | G06F 16/3344 |
| 2021/0383261 | A1 * | 12/2021 | Hanna | .................. | G06Q 10/105 |
| 2022/0138651 | A1 * | 5/2022 | Ramaswamy | .......... | G06Q 50/01 |
| | | | | | 705/7.13 |
| 2022/0263877 | A1 * | 8/2022 | Conlin | .................. | H04L 65/765 |
| 2022/0292459 | A1 * | 9/2022 | Sabharwal | ............. | G06N 20/00 |
| 2023/0075767 | A1 | 3/2023 | Bradley | | |

FOREIGN PATENT DOCUMENTS

| CN | 112182057 A | 1/2021 |
| CN | 113919869 A | 1/2022 |

* cited by examiner

*Primary Examiner* — Shahid A Alam
(74) *Attorney, Agent, or Firm* — Caldwell Intellectual Property Law

(57) ABSTRACT

An apparatus for the generation of exploitation data is disclosed. The apparatus comprises at least a processor and a memory communicatively connected to the at least a processor. The memory instructs the processor to receive a plurality of entity profiles from a plurality of entities, wherein each of the plurality of entity profiles comprises a plurality of operational data. The memory instructs the processor to identify demand data as a function of the plurality of entity profiles. The memory instructs the processor to generate exploitation data as a function of the operational data and the demand data. The memory instructs the processor to determine collaboration data as a function of the exploitation data. The memory instructs the processor to display the collaboration data using a display device.

16 Claims, 10 Drawing Sheets

APPARATUS AND A METHOD FOR THE GENERATION OF EXPLOITATION DATA

FIELD OF THE INVENTION

The present invention generally relates to the field of artificial intelligence. In particular, the present invention is directed to an apparatus and a method for the generation of exploitation data.

BACKGROUND

Automated identification of exploitation data is becoming increasingly important and difficult. Additionally, accurately pairing two or more entities based on empirical data using a computing process has been an inexact and inaccurate process due to numerous variables and inaccurate pairings. Current attempts at combining these processes have failed in accurately pairing entities based to capitalize on underserved markets due gross inaccuracies and inefficiencies.

SUMMARY OF THE DISCLOSURE

In an aspect, an apparatus for the generation of exploitation data is disclosed. The apparatus includes at least a processor and a memory communicatively connected to the at least a processor. The memory instructs the processor to receive a plurality of entity profiles from a plurality of entities, wherein each of the plurality of entity profiles includes a plurality of operational data, wherein the plurality of entity profiles additionally includes a first entity profile and a second entity profile. The memory instructs the processor to identify demand data as a function of the plurality of entity profiles. The memory instructs the processor to generate exploitation data as a function of the operational data and the demand data. The memory instructs the processor to generate exploitation data as a function of the operational data and the demand data. The memory then instructs the processor to display the collaboration data using a display device.

In another aspect, a method for the generation of exploitation data is disclosed. The method includes receiving, using at least a processor, a plurality of entity profiles from a plurality of entities, wherein each of the plurality of entity profiles comprises a plurality of operational data, wherein the plurality of entity profiles additionally comprises a first entity profile and a second entity profile. The method includes identifying, using the at least a processor, demand data as a function of the plurality of entity profiles. The method includes generating, using the at least a processor, exploitation data as a function of the operational data and the demand data. The method includes determining, using the at least a processor, collaboration data as a function of the exploitation data. The method includes displaying the collaboration data using a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of exploitation data is disclosed. The apparatus comprises at least a processor and a memory communicatively connected to the at least a processor. The memory instructs the processor to receive a plurality of entity profiles from a plurality of entities, wherein each of the plurality of entity profiles includes a plurality of operational data, wherein the plurality of entity profiles additionally includes a first entity profile and a second entity profile. The memory instructs the processor to identify demand data as a function of the plurality of entity profiles. The memory instructs the processor to generate exploitation data as a function of the operational data and the demand data. The memory instructs the processor to generate exploitation data as a function of the operational data and the demand data. The memory then instructs the processor to display the collaboration data using a display device. Exemplary embodiments illustrating aspects of the present disclosure are described below in the context of several specific examples.

Figure 1:
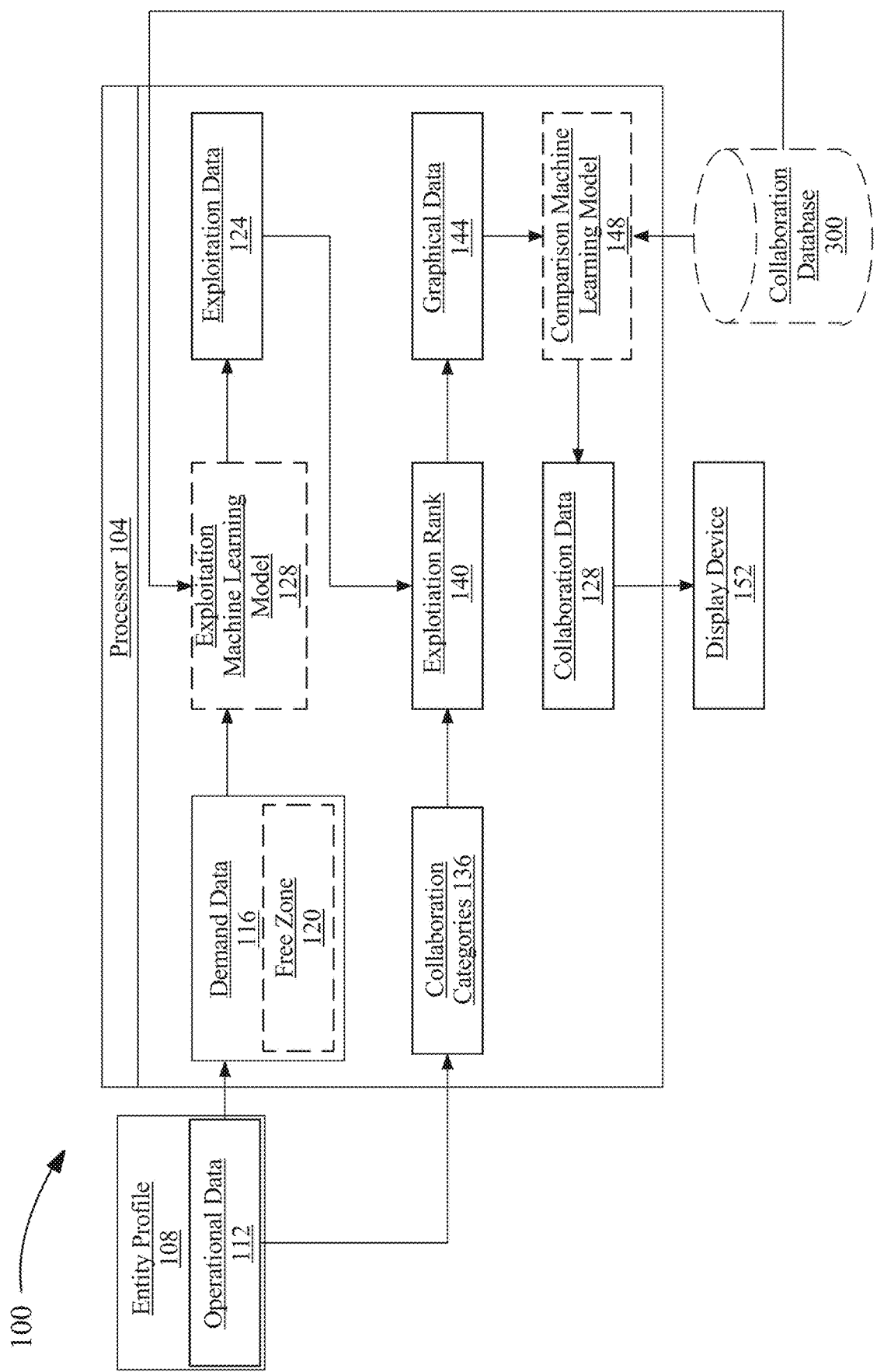
FIG. 1 is a block diagram of an exemplary embodiment of an apparatus for the generation of exploitation data.

Referring now to FIG. 1, an exemplary embodiment of an apparatus 100 for the generation of exploitation data is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relate which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to receive a plurality of entity profiles 108 from a plurality of entities. For the purposes of this disclosure, an "entity profile" is a data structure representing an entity. An entity profile 108 may be made up of a plurality of entity data. As used in the current disclosure, "entity data" is information associated with the entity. As used in the current disclosure, an "entity" is an organization comprised of one or more persons with a specific purpose. An entity may include a corporation, organization, business, group, and the like. An entity profile 108 may be created by a processor 104, a user, or a third party. As used in the current disclosure, a "user" is an authoritative figure within the entity. The user may include a manager, owner, or shareholder of the entity. The entity data may include information regarding the entity's revenue, gross income, net income, business debts, a list of business expenses, current inventory, inventory history, sales information, human resource information, employee information, employee salaries, time cards, a list of company assets, a list of capital projects, accounting information, clientele, relationship status, business associates, profession, experience, finances, geographic location, and the like. A plurality of entity profiles 108 may include a first entity profile and a second entity profile, wherein the first entity profile and the second entity profile are both entity profiles 108 as defined herein above. The first entity profile may be associated with a first entity, whereas the second entity profile may be associated with a second entity. In a non-limiting example, the entity profile may be consistent with or substantially consistent with the user profile described in U.S. patent application Ser. No. 18/141,320, filed on Apr. 28, 2023, titled "METHOD AND AN APPARATUS FOR ROUTINE IMPROVEMENT FOR AN ENTITY," which is incorporated by reference herein in its entirety.

With continued reference to FIG. 1, each entity profile 108 of the plurality of entity profiles 108 comprises a plurality of operational data 112. As used in the current disclosure, "operational data" is information that describes the operations of the entity. The operations of a business may include any tasks or jobs that are executed on behalf of the entity. Operational data 112 may also refer to information generated and collected during the day-to-day operations of an organization. Operational data 112 includes various types of data that are crucial for the functioning and decision-making processes within an entity. Operational data 112 may include information about the entity's sales, production, customer interactions, supply chain, human resources, marketing, website, social media, operational efficiency, strengths, weakness, industry, and the like of an entity. Operational data 112 may comprise an indication of the industry of the entity. Occupation data 112 may additionally include an indication of the current operational capabilities of the entity. As used in the current disclosure, "operational capabilities" are described as the ability of the entity generate products or provide services. The operational capabilities of an entity may include the entities capacity, resources, and skills to effectively carry out its day-to-day activities and achieve its operational objective. Operational capabilities may include the infrastructure of the entity. Infrastructure may include any physical and technological assets, facilities, and resources that support the entity's operations. This includes buildings, equipment, machinery, IT systems, communication networks, and other necessary infrastructure. Operational Capabilities may also include an indication of the processes and procedures of the entity. This includes how tasks are structured, coordinated, and executed within the organization to achieve efficiency, quality, and compliance with relevant standards or regulations. Operational capabilities of an entity may include information regarding the supply chain of the entity. This may include the entity's ability to manage the flow of materials, products, and services throughout its supply chain. This involves procurement, inventory management, logistics, supplier relationships, and coordination to ensure timely and cost-effective delivery of goods or services. Operational data 112 may include information regarding the quality of the goods and services provided by the entity. This may include an indication of a price point of the goods and services and where that price point falls within the overall marketplace. The entity's commitment to maintaining and improving the quality of its products, services, and operational processes. This includes quality control measures, quality assurance systems, compliance with industry standards or certifications, and continuous improvement initiatives. Operational data 112 may be used for analysis, reporting, and decision-making purposes. By analyzing this data, organizations can gain insights into their operations, identify patterns, detect anomalies, and make informed decisions to improve efficiency, optimize resources, and enhance customer satisfaction.

With continued reference to FIG. 1, an entity profile 108 may include entity records. As used in the current disclosure, an "entity record" is a document that contains information regarding the entity. Entity records may include employee credentials, reports, financial records, medical records, business records, asset inventory, sales history, sales predictions, and government records (i.e. birth certificates, social security cards, and the like). An entity record may additionally include an employee record. An employee record may include things like employee evaluations, human resource records, client files, invoices, timecards, driver's license databases, news articles, social media profiles and/or posts, and the like. Entity records may be identified using a web crawler. Entity records may include a variety of types of "notes" entered over time by the user, employees of the user, support staff, advisors, and the like. In some embodiments, processor 104 may be configured to convert entity records into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may classify operational data 112 into a plurality of operational categories. As used in the current disclosure, "operational categories" is a category that is representative of one or more aspects of the user's operational data 112. These categories help define and evaluate different aspects of an operational capabilities as a strength or a weakness. Non-limiting examples of operational categories may include task completion time, task completion rate, quality of tasks completed, quantity of tasks completed, time management, task prioritization, workflow optimization, supervision required, goal achievement, attention to detail, adaptability and flexibility, communication and collaboration and the like. In an embodiment, a processor 104 may be configured to generate a plurality of operational categories based on the available entity profiles 108 and the operational data 112. Processor 104 may generate a plurality of operational categories based on historical versions of the operational categories. Processor 104 may generate a plurality of operational categories by extracting relevant features, characteristics, or traits associated with each entity profile 108 or the operational data 112. Identification of features may depend on the nature of the entity and the tasks that the entity is instructed to complete. In other embodiments, a processor 104 be configured to receive a plurality of operational categories from a database such as database 300. In an embodiment, processor 104 may further classify operational data 112 in categories, such as strengths or weaknesses and derivatives thereof. Processor 104 may identify the strengths or weaknesses of the entity by comparing the current user's operational data 112 to previous iterations of operational data 112. Processor 104 may receive historical examples of entity profiles 108 and their corresponding operational data 112 from a database such as database 300. Processor 104 may compare the current entity profile 108 to the previous entity profile 108 and their corresponding operational data 112. Entity profiles 108 may be compared by entity size, entity revenue, personnel experience, personnel tenure, ability to completed tasks, number of tasks completed, expected completion time, infrastructure, number of services provided, number of good produced, and the like. Processor 104 may use the previous strengths or weaknesses of past entity profile 108 to classify elements of operational data 112 of the current entity profile 108 as a strength/weaknesses. Each operational datum 112 may represent an entity profile 108. For instance, a first Operational datum may be representative of a first entity profile, while a second operational datum may be representative of a second entity profile, and up to an nth operational datum may be representative of an nth entity profile.

With continued reference to FIG. 1, processor 104 may be configured to classify the operational data 116 into operational categories using an operation machine-learning model. As used in the current disclosure, an "operation machine-learning model" is a machine-learning model that is configured to generate operational data 116. The operation machine-learning model may be consistent with the classifier as described below in FIG. 2. Inputs to the operation machine-learning model may include entity profile 108, operational data 112, operational capabilities, and the like. Outputs to the operation machine-learning model may include operational data 116 sorted into a plurality of operational categories. In some embodiments, an operation machine learning model may be configured to generate an operational capability of an entity as a function of the operational data 112. This may include sorting the operational data 112 into categories that represent the efficiencies or inefficiencies of the user or entity and the derivatives there of. Operational training data is a plurality of data entries containing a plurality of inputs that are correlated to a plurality of outputs for training a processor by a machine-learning process. In an embodiment, operational training data may comprise a plurality of operational data 112 correlated to a plurality of operational categories. In another embodiment, operational training data may comprise a plurality of operational data 112 correlated to examples of operational capabilities. In an embodiment, processor 104 may be configured to sort each operational capability of the entity into one or more operational categories. Operational training data may be received from database 300. Operational training data may contain information regarding entity profile 108, operational data 112, operational capabilities, and the like. Machine-learning models may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning models, learning vector quantization, and/or neural network-based machine-learning models.

With continued reference to FIG. 1, processor 104 is configured to identify demand data 116 as a function of the plurality of entity profiles 108. As used in the current disclosure, "demand data" is information regarding the market demand for goods or services. Market demand may refer to the total quantity of a product or service that customers are willing and able to purchase at a given price during a specific period. It may represent the collective demand of all customers in the market for a particular product or service. Demand data 116 may be calculated for the entire market or for one or more goods or services that are provided. Additionally, demand data 116 may be calculated using sales data from the retailers and service providers who are present in the market. Demand data 116 may be calculated using several factors including the price range for the goods and services, consumer preferences, target groups, target group income levels, consumer trends, market competition, and the like. Demand data 116 may include a description of the demand for goods and services within a geographic area. Demand data 116 may include information relating to demographics of the people or companies who have a demand for the goods or services. In an embodiment, demand data 116 may be described as a monetary value of the market. The monetary value of the market may be described as the sum of the value of the goods and services that have been provided. Demand data 116 may include a prediction of the monetary value of the market at various time intervals. Determining the value of the market demand may involve assessing the market size, market growth, market growth rate, market growth potential, profit margins, and other relevant factors. In an embodiment, a processor 104 may be configured to determine demand using cookies or website views. In an embodiment, processor 104 may be configured to insert a tracking code into the web pages where you want to track clicks and page views. This code typically consists of JavaScript or HTML snippets that collect data when users interact with your website. This may include setting up event tracking to capture clicks on specific elements or actions that indicate user demand. For example, you might track clicks on buttons, links, or form submissions. When a user performs a click action, the tracking code will send a request to the analytics tool with relevant information. The tracking code should also automatically capture page view data whenever a user visits a page on your website. It usually records details like the page URL, referring source, and timestamps. Processor 104 may be configured to count the number of views, searches, clicks, inquiries, and the like to determine the demand data 116.

With continued reference to FIG. 1, demand data 116 may include a demand scope. As used in the current disclosure, a "demand scope" is an identification of the industry or market segment that is associated with the demand. Demand scope may include an identification and segmentation of the market based on relevant characteristics such as geography, demographics, customer behavior, or product/service attributes. This segmentation helps understand the specific demand patterns within different market segments. Processor 104 may determine the market scope based on the operational data 112 associated with the entity profile 108. More specifically, demand scope may be determined based on the industry of the entity and the operational capabilities. For example, an entity is currently a mining company the market scope may be limited to mining products and biproducts. Processor 104 may generate demand data 116 as a function of the market data. Processor 104 may collect relevant market data that provides insights into the demand drivers for the industry. Market data may include market research reports, industry surveys, government publications, trade associations' data, customer surveys, or any other reliable sources of information. In some embodiments this information may be gathered using a webcrawler. Demand data 116 may include an analysis of economic indicators. This may include an analysis of macroeconomic indicators that can influence industry demand. Factors such as GDP growth, population trends, employment rates, inflation, consumer spending, and government policies can impact the overall demand for goods and services within an industry. In some embodiment, a demand data 116 may include an analysis of the competitive landscape within a given industry. This may include an identification of the players within the market and their market share. This may include an identification and analysis of the market share and growth rates of key competitors, identify any emerging players or disruptive technologies, and consider the impact of industry-specific factors like barriers to entry, regulatory environment, and customer preferences.

With continued reference to FIG. 1, demand data 116 may include an identification of one or more free zones 120 within the market. As used in the current disclosure, a "free zone" is a segment or area of the market that has not been fully explored or developed by entities. A free zone 120 may include information about the goods and service providers within the market. This may include a description of the market share of each provider. In some embodiments, a free zone 120 may include an identification of a target group for the goods and services or the target group for each provider. As used in the current disclosure, a "target group" refers to the characteristics of a population or specific consumer segments based on various factors such as age, gender, income, education, occupation, marital status, ethnicity, and geographic location. Target group information provides insights into the composition and preferences of consumer groups, enabling entities to understand and target their products or services more effectively. A free zone 120 may represent a potential customer base or business opportunity that has yet to be targeted or served effectively. The concept of a free zone 120 implies that there is a demand or need that has not been adequately addressed, leaving room for new entrants or existing businesses to capture market share and generate growth. Identifying a free zone 120 may require an analysis of the demand data 116 to understand consumer needs, preferences, and unmet demands. Identifying a free zone 120 may include an identification of a target group such as specific age ranges, ethnicities, or geographic areas, may have unique needs and preferences that are not fully catered to by existing products or services. A free zone 120 may additionally include an identification of new industries or technologies that are still in their early stages and may present untapped market opportunities. These markets may lack established players or comprehensive solutions, leaving room for innovation and market entry. In some embodiments, identification of a free zone 120 may include an identification of niche markets. Niche markets may be a specialized segment of the market with specific needs and preferences. They may be underserved or overlooked by mainstream businesses, creating opportunities for companies that can effectively target and cater to those niches. In other embodiments, the identification of a free zone 120 may include the identification of new geographic regions, either domestically or internationally, which can open up untapped markets. Different regions may have unique cultural, economic, or regulatory factors that create opportunities for new products or services.

With continued reference to FIG. 1, demand data 116 may be generated using a web crawler. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile the demand data 116 and identify free zones 120. The web crawler may be seeded and/or trained with a reputable website, such as the user's business website, to begin the search. Additional examples of reputable websites may include websites that contain information regarding geopolitical news, governmental websites, accrediting organizations websites, groups websites, and the like. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past demand data 116, past identify free zones 120, sales records, user notes, and observations, based on criteria such as a time, location, and the like.

With continued reference to FIG. 1, processor 104 may generate, using demand data 116, a demand machine-learning model. As used in the current disclosure, an "demand machine-learning model" is a machine-learning model that is configured to generate demand data 116. The demand machine-learning model may be consistent with the machine-learning model described below in FIG. 2. Inputs to the demand machine-learning model may include entity profile 108, entity data, operational data 112, examples of demand data 116, and the like. Outputs to the demand machine-learning model may include a demand data 116 tailored to the entity profiles 108 and/or an indication of free zones 120. Demand training data is a plurality of data entries containing a plurality of inputs that are correlated to a plurality of outputs for training a processor by a machine-learning process. In an embodiment, demand training data may include a plurality of entity profiles correlated to examples of demand data 116. Demand training data may be received from database 300. Demand training data may contain information regarding entity profile 108, entity data, operational data 112, examples of demand data 116, and the like. In an embodiment, a demand machine-learning model may be iteratively updated with the input and output results of past demand machine-learning models. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model.

With continued reference to FIG. 1, processor 104 may be configured to generate exploitation data 124 as a function of the operational data 112 and the demand data 116. As used in the current disclosure, "exploitation data" is information related to the capitalizing on one or more free zones 120 within the market. Capitalizing may include examining the viability of one or more entities inserting themselves into the underserved market. This may be done to identify opportunities to gain market share and to maximize profits. Capitalizing on free zones 120 may involve identification of leveraging the opportunities presented by the market gap to maximize business growth and profitability. Exploitation data 124 may include one or more suggestions of what is needed from one or more entity to capitalize on the free zones 120. This may include an identification of one or more traits or attributes of an entity that will allow the entity to capitalize on the free zone 120 within the market. Example of traits/attributes may include infrastructure, types of personnel, quantity of personnel, equipment needed, subject matter expertise needed, marketing strategies, adaptation of goods/services for a new market, and the like. In a non-limiting example, demand data 116 may identify that the demand for a given product is at 20 million dollars per year nationwide. Additionally, demand data 116 may include an identification of a free zone 120 within the market which identifies an underserved foreign geographic location within the market. Given the demand data 116 processor 104 may generate exploitation data 124 which identifies several traits of an entity that are needed to provide goods or services to the foreign geographic location. These traits may include having a supply chain and infrastructure within the foreign geographic location. In other embodiments, exploitation data 124 may include an identification types of goods/products that are in demand according to demand data 116. This may include the specific attributes of the goods/services that are in demand. Attributes may include traits like free delivery, high end materials, high/low price point, availability within a geographic location, and the like. Exploitation data 124 may be generated by providing an indication of what is needed to access the free zone 120 in the market. Processor 104 may compare the current free zone 120 and demand data 116 to historical versions of exploitation data 124 to generate a current version of exploitation data 124.

With continued reference to FIG. 1, processor 104 may use statistical modeling techniques to analyze the data collected and develop a predictive model for generating the exploitation data 124. As used in the current disclosure, a "predictive model" is a mathematical or statistical model that is designed to predict the outcome of a specific event or phenomenon. A predictive model may be used to provide insights and predictions that can be used to inform decision-making and improve outcomes. Predictive models use historical data to identify patterns and trends that can be used to predict future outcomes. A predictive model may be configured to receive an input such as an entity profile 108, operational data 112, demand data 116, demand scope, free zones 120, examples of exploitation data 124, and the like. A predictive model may be configured to output exploitation data 124 that is tailored to the demand data 116. The predictive model may use historical and current versions of the inputs to make accurate predictions about future incidents and the cost associated with those events. In some embodiments, a predictive model may be configured to clean and process the input to ensure its accuracy and consistency. This step involves identifying and correcting errors, removing duplicates, and converting data into a usable format. Processor 104 may then be configured to choose an appropriate model or algorithm that can effectively predict the outcome. This may involve selecting a model that is suitable for the data set, and that has a good balance between accuracy and interpretability. This may include an algorithm or machine-learning model described herein including an exploitation machine-learning model 128 as mentioned herein below.

With continued reference to FIG. 1, processor 104 may generate exploitation data 124 using an exploitation machine-learning model 128. As used in the current disclosure, an "exploitation machine-learning model" is a machine-learning model that is configured to generate exploitation data 124. The exploitation machine-learning model may be consistent with the machine-learning model described below in FIG. 2. Inputs to the exploitation machine-learning model may include entity profile 108, entity data, operational data 112, demand data 116, demand scope, free zones 120, examples of exploitation data 124, and the like. Outputs to the exploitation machine-learning model may include an exploitation data 124 tailored to the free zones 120. Exploitation training data is a plurality of data entries containing a plurality of inputs that are correlated to a plurality of outputs for training a processor by a machine-learning process. In an embodiment, exploitation training data may include a plurality of operational data 112 correlated to examples of exploitation data 124. In another embodiment, exploitation training data may include a plurality of free zones 120 correlated to examples of exploitation data 124. Exploitation training data may be received from database 300. Exploitation training data may contain information regarding entity profile 108, entity data, operational data 112, demand data 116, demand scope, free zones 120, examples of exploitation data 124, and the like. In an embodiment, exploitation machine-learning model may be iteratively updated with the input and output results of past exploitation machine-learning models. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model.

With continued reference to FIG. 1, exploitation machine-learning model 128 may greatly enhance the functionality of software for generating and improving exploitation data 124 related to a user. By leveraging large datasets and advanced algorithms, exploitation machine-learning model 128 can analyze patterns, extract insights, and make accurate predictions based on user behavior and preferences. This may enable apparatus 100 to generate exploitation data 124 that reflects the likelihood or reliability of specific outcomes or recommendations for the user. Through continuous learning and adaptation, exploitation machine-learning model 128 may dynamically update the exploitation data 124 based on real-time data. This enables software to provide personalized and contextually relevant results, improving user satisfaction and engagement. Machine learning also enables software to identify and analyze complex relationships and dependencies that may be difficult for traditional rule-based systems to capture. As a result, the generated exploitation data 124 becomes more accurate and reliable, empowering users to make informed decisions based on trustworthy insights and predictions.

With continued reference to FIG. 1, processor 104 may be configured to update the training data of the exploitation machine-learning model 128 using user inputs. An exploitation machine-learning model 128 may use user input to update its training data, thereby improving its performance and accuracy. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for classifier using user feedback. For the purposes of this disclosure, "accuracy score," is a numerical value concerning the accuracy of a machine-learning model or classifier. For example, the accuracy of a plurality of exploitation data 124 may be averaged to determine an accuracy score. In some embodiments, an accuracy score may be determined for a particular user or a set users. Accuracy score or another score as described above may indicate a degree of retraining needed for a machine-learning model. Processor 104 may perform a larger number of retraining cycles for a higher number (or lower number, depending on a numerical interpretation used), and/or may collect more training data for such retraining.

With continued reference to FIG. 1, processor 104 is configured to determine collaboration data 132 as a function of the plurality of exploitation data 124. As used in the current disclosure, "collaboration data" is an element of data describing as an element of data that describes the degree of match between two or more entities. As used in the current disclosure, a "degree of match" refers to the extent to which two or more entities, systems, or elements can work together harmoniously, effectively, and without conflict to capitalize on a free zone. It signifies the degree of suitability, agreement, or alignment between the entities involved. The degree of match between a first entity profile and a second entity profile may be described as how well the entity's assets complement each other with the goal of capitalizing a free zone 120 as described by the exploitation data 124. In a non-limiting example, a first entity has assets including a plethora of specialized equipment as described by a first entity profile. A second entity has assets that include an abundance of infrastructure which is capable of serving underserved geographic areas as described by a second entity profile. Collaboration data 132 may describe a prediction of how well the first entity's assets will complement the assets of the second entity. The first entity profile and the second entity profile may be paired based on their respective exploitation ranking and the classification of the operational data 112 into collaboration categories 136.

With continued reference to FIG. 1, determining the collaboration data 132 includes classifying the plurality of operational data 112 into a plurality of collaboration categories 136. As used in the current disclosure, an "collaboration category" is a category that is representative of at least one aspect of the collaboration of the entities. Collaboration categories may be generated based on criteria laid out by the exploitation data 124. In a non-limiting example, if the exploitation data 124 describes the need for specialized equipment, 10 personnel, and a warehouse to capitalize on the free zone 120. The collaboration categories 136 may include categories for financial resources, specialized equipment, personnel members, warehouse space, and the like. Additional, non-limiting examples of collaboration categories 136 may include categories such as personnel, infrastructure, resources, equipment, clientele, financial ability, finances, office space, buildings, structures, expertise, types of goods/products, quality of goods/products, and the like. In an embodiment, a processor 104 may be configured to generate a plurality of collaboration categories 136 based on the available entity profiles 108. Processor 104 may generate a plurality of collaboration categories 136 based on historical versions of the collaboration categories. Processor 104 may generate a plurality of collaboration categories 136 by extracting relevant features, characteristics, or traits associated with the exploitation data 124. Identification of features may depend on the nature of the demand data 116 and the requirements set out by the exploitation data 124. In other embodiments, a processor 104 be configured to receive a plurality of collaboration categories 136 from a database such as database 300. Processor 104 may pair a first entity profile and a second entity profile based on the classification of their respective individual operational data 112 into each of the plurality of collaboration categories 136. The classification may occur if the operational capability of an entity at least partially matches or exceeds the requirements set out by the collaboration categories 136. Additionally, processor 104 may further classify operational data 112 within the categories as assets or liabilities. In a non-limiting example, the assets/liabilities of an entity may include the quality of the brand's image/reputation, quality of products/services, quality of customer service, location, technology, customer base, and the like. In an embodiment, the classification of a plurality of operational data into a plurality of collaboration categories may be done using a collaboration machine learning model as described herein below.

With continued reference to FIG. 1, the classification of the plurality of operational data 112 into a plurality of collaboration categories 136 may be done using a collaboration classifier. As used in the current disclosure, a "collaboration classifier" is a machine-learning model that is configured to classify of the plurality of operational data 112 into a plurality of collaboration categories 136. The collaboration classifier may be consistent with the classifier that is described herein below in FIG. 2. Inputs to the collaboration classifier may include an entity profile 108, entity data 112, demand data 116, demand scope, free zones, collaboration categories 136, and the like. Outputs to the collaboration classifier may include a classification of the plurality of operational data 112 into a plurality of collaboration categories 136. Collaboration training data is a plurality of data entries containing a plurality of inputs that are correlated to a plurality of outputs for training a processor by a machine-learning process. In an embodiment collaboration training data may include a plurality of operational data 112 correlated to a plurality of collaboration categories 136. Collaboration training data may be received from database 300. Collaboration training data May contain information about entity profile 108, entity data 112, demand data 116, demand scope, free zones, collaboration categories 136, and the like. Classifiers such as the collaboration classifier may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, determining the collaboration data 132 includes determining an exploitation rank 140 as a function of the classification of the plurality of operational data 112 into collaboration categories 136. As used in the current disclosure, an "exploitation rank" is a score that describes how well the resources or attributes of an entity will be able to capitalize on the free zone 120 within the market. A processor 104 may generate an exploitation rank for each entity that is participating in the collaboration. The exploitation ranking for each entity may be based on the amount of resources each entity contributes to monetize the free zones 120 within the market. A processor 104 may generate an exploitation rank 140 for each resource that is contributed of each entity. An exploitation rank 140 may be used to normalize operational data 112 to bring all attributes/resources onto a comparable scale. This step is important to eliminate any bias introduced by different units or measurement scales. Normalization techniques can include min-max scaling, z-score normalization, or logarithmic transformation. In an embodiment, if an entity possesses a particularly strong attribute the exploitation rank 140 may be high, conversely if it if an entity possesses a particularly weak attribute the exploitation rank 140 may be low. An exploitation rank 140 may be expressed as a numerical score, a linguistic value, or an alphabetical score. Exploitation rank 140 may be represented as a score used to reflect the degree to which the entity is contributing to the capitalization of the free zone 120. A non-limiting example, of a numerical score, may include a scale from 1-10, 1-100, 1-1000, and the like, wherein a rating of 1 may represent an unfavorable attribute of the entity, whereas a rating of 10 may represent a highly favorable attribute of the entity. Additionally, on a scale from 1-100 a score of 50 may represent a resource/attribute that is of average value to the collaboration, whereas a rating of 15 may represent a resource/attribute that is of low value to the collaboration to the collaboration and a rating of 94 may represent a resource/attribute that is of high value to the collaboration. In another non-limiting example, linguistic values may include, "High Value," "Moderate Value," "Neutral Value," "Low Value," and the like. In some embodiments, linguistic values may correspond to a linguistic variable score range. For example, an attribute that receives a score between 40-60, on a scale from 1-100, may be considered a "Moderate Value."

With continued reference to FIG. 1, the exploitation ranking 140 for each attribute/resource given by an entity may be generated based on one or more attribute quantifiers. As used in the current disclosure, an "attribute quantifier" is a quantifier used to give a category associated with a given attribute weight. These categories may include one or more collaboration categories 136. In an embodiment, an attribute quantifier may be generated as a function of a plurality of collaboration categories 136 An attribute quantifier may be used to assign weights or importance values to each collaboration category and the attributes associated with those categories. based on their statistical significance and impact on entity performance. As used in the current disclosure, an "importance value" refers to a measure that quantifies the significance or contribution of a collaboration category 136. It indicates the relative importance or influence of data within the collaboration category 136 in explaining the variation or outcome of interest. Importance values can be calculated using techniques like regression coefficients, variable importance measures in machine learning algorithms (e.g., feature importance in decision trees), or factor loadings in factor analysis. This can be done using statistical models, domain expertise, or machine learning algorithms. The weights should reflect the relative contribution of each attribute to the overall success of the collaboration. Processor 104 may generate an attribute quantifier based on demand data 116 and exploitation data 124. Specifically, this may include the size of the entity, types of goods and services provided, quality of goods and services provided, target groups, and the like. A processor may generate an attribute quantifier based on historical attribute quantifiers for entities of similar size, industry, and status. Processor 104 may additionally apply analysis statistical techniques to analyze the data and assess the relationship between each attribute and the overall entity performance. Techniques such as correlation analysis, regression analysis, or machine learning algorithms may be used to help identify the attributes that have a significant impact on business outcomes.

With continued reference to FIG. 1, processor 104 may generate the exploitation rank 140 using an exploitation rank machine-learning model. As used in the current disclosure, an "exploitation rank machine-learning model" is a machine-learning model that is configured to generate an exploitation rank 140. The exploitation rank machine-learning model may be consistent with the machine-learning model described below in FIG. 2. Inputs to the exploitation rank machine-learning model may include entity profile 108, entity data 112, demand data 116, demand scope, free zones, collaboration categories 136, attribute qualifiers, examples of exploitation rankings 140, and the like. Outputs to the exploitation rank machine-learning model may include an exploitation rank 140 tailored to one or more attributes of the entity. Exploitation ranking training data is a plurality of data entries containing a plurality of inputs that are correlated to a plurality of outputs for training a processor by a machine-learning process. In an embodiment, exploitation ranking training data may include a plurality of classified operational data 112 correlated to examples of exploitation rankings. Exploitation rank training data may be received from database 300. Exploitation rank training data may contain information regarding entity profile 108, entity data 112, demand data 116, demand scope, free zones, collaboration categories 136, attribute qualifiers, examples of exploitation ranks 140, and the like. In an embodiment, an exploitation rank machine-learning model may be iteratively updated with the input and output results of past exploitation rank machine-learning models. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model. With continued reference to FIG. 1, a processor 104 is configured to determine the collaboration data 132 as a function of plotting a plurality graphical data 144 as a function of the exploitation rank 140. As used in the current disclosure, "graphical data" is a visual representation of information or data points that convey various attributes of an entity. Graphical data 144 may refer to any type of data that is presented visually through graphical representations, such as charts, graphs, diagrams, maps, and other visual aids. These visual representations may represent complex data and are used to communicate information in a way that is easier to comprehend. Graphical data 144 can come in many forms, depending on the type of data being presented and the intended audience. For example, a line graph may be used to show the trend of a particular data set over time, while a pie chart may be used to display the distribution of different categories within a larger data set. Other types of graphical data 144 may include bar charts, scatter plots, heat maps, network diagrams, and the like. Graphical data 144 may include a graphical representation of one or more elements of operational data 112 or an exploitation rank 140. This graphical representation may include one or more exploitation rankings 140 plotted as a single point or plotting a plurality of graphical data 144 over time. This may include a graphical representation of any of the characteristics and attributes of the entity represented above, wherein these attributes may be quantitative or qualitative in nature. In some embodiments, graphical data 144 may include plotting an exploitation rank 140 along a continuum. As used in the current disclosure, a "continuum" is a spectrum or a range of values, qualities, or attributes that exist along a single dimension or scale. A continuum may represent a continuous progression from one extreme to another, without any clear-cut boundaries or discrete categories. In a continuum, there are no distinct breakpoints or divisions, but instead, there is a gradual transition or progression from one end to the other. In some embodiments, a continuum may represent qualitative traits that exist on a spectrum. In a non-limiting example, a continuum may represent the degree to which a characteristic or a trait of an entity is an asset, or a liability as represented by one or more exploitation rankings 140. Graphical data 144 may include a plurality of continuums, wherein each continuum represents one more trait or characteristic of an entity. In some embodiments, multiple continuums may be combined to generate an XY plot or an XYZ plot. Graphical data 144 may include the identification of one or more attribute clusters. As used herein, an "attribute cluster" is a collection of data points representing at least one attribute or characteristic of an entity. An attribute may include any or all of a feature, section, knowledge, asset, or skill of an entity. In non-limiting examples, if an entity is a company, an attribute may include a branch of the company or a particular area of expertise of employees of the company. Attribute cluster may include a single attribute of the entity, or they may include more than one attribute. Attribute clusters may include multiple related attributes. In a non-limiting example, an attribute cluster may include knowledge of how to paint and an inventory of paintbrushes. In another non-limiting example, an attribute cluster may include knowledge of how to use several computer programs, each useful for an aspect of creating virtual artwork. In another non-limiting example, an attribute cluster may include knowledge of how to use a single computer program. In some embodiments, graphical data 144 may include a first graphical datum and a second graphical datum, whereas the first graphical datum is associated with the first entity profile, and the second graphical datum is associated with the second entity profile. Graphical data 144 may additionally be generated using any machine learning model described herein. In a non-limiting example, the graphical data 144 may be consistent with or substantially consistent with the graphical data described in U.S. patent application Ser. No. 18/399,304, filed on Dec. 28, 2023, titled "APPARATUS AND A METHOD FOR THE GENERATION OF A COLLABORATION SCORE," which is incorporated by reference herein in its entirety.

With continued reference to FIG. 1, processor 104 may compare a first graphical datum and a second graphical datum using a comparison machine-learning model 148. As used in the current disclosure, a "comparison machine-learning model" is a machine-learning model that is configured to generate collaboration data 132 based on the comparison of a first graphical datum and a second graphical datum. Comparison machine-learning model 148 may be consistent with the machine-learning model described below in FIG. 2. Inputs to the comparison machine-learning model 148 may include a plurality of entity profiles 108, operational data 112, demand data 116, demand scope, free zones 120, exploitation data 124, collaboration categories 136, exploitation rankings 140, graphical data 144, first graphical datum, second graphical datum, examples of collaboration data 132, and the like. Outputs to the comparison machine-learning model 148 may include collaboration data 132 tailored to the comparison of the first graphical datum and the second graphical datum. A comparison of the first graphical datum and a second graphical datum may be a comparison to determine the level of compatibility between the attributes of a first entity and a second entity. In an embodiment, the comparison may include an identification of how well the attributes labeled as assets of both entities when combined will be able to capitalize on the free zone 120. Comparison training data may include a plurality of data entries containing a plurality of inputs that are correlated to a plurality of outputs for training a processor by a machine-learning process to correlate a first graphical datum and a second graphical datum to examples of collaboration data 132. In an embodiment, comparison training data may include a plurality of first graphical data and a plurality of second graphical data to examples of collaboration data 132. Comparison training data may be received from database 300. Comparison training data may contain information about entity profiles 108, operational data 112, demand data 116, demand scope, free zones 120, exploitation data 124, collaboration categories 136, exploitation rankings 140, graphical data 144, first graphical datum, second graphical datum, examples of collaboration data 132, and the like. In an embodiment, comparison training data may be iteratively updated as a function of the input and output results of past comparison machine-learning model or any other machine-learning model mentioned throughout this disclosure.

With continued reference to FIG. 1, processor 104 may identify the collaboration data 132 as a function of a comparison between the first graphical datum and the second graphical datum using a comparison fuzzy inference. As used in the current disclosure, a "comparison fuzzy inference" is a method that interprets the values in the input vector (i.e., first graphical data and second graphical data.) and, based on a set of rules, assigns values to the output vector. A set of fuzzy rules may include a collection of linguistic variables that describe how the system should make a decision regarding classifying an input or controlling an output. Fuzzy inference rules operate on fuzzy sets and provide a framework for mapping input variables to output variables through linguistic rules. Fuzzy inference rules may operate using linguistic variables, which represent imprecise or vague concepts rather than precise numerical values. Linguistic variables are defined by membership functions, which describe the degree of membership or truth for different linguistic terms or categories. In a non-limiting example, a linguistic variable "Resources" may have linguistic terms like "Strong Resources," "Moderate Resources," and/or "Weak Resources," each with its corresponding membership function. A fuzzy inference rule typically follows a conditional "IF-THEN" structure. It consists of an antecedent (IF part) and a consequent (THEN part). The antecedent specifies the conditions or criteria based on which the rule will be applied, and the consequent determines the output or conclusion of the rule. In a non-limiting example, of a fuzzy inference rule if a first graphical datum includes a linguistic variable representing "Strong Resources" and the second graphical datum includes a linguistic variable representing "Moderate Resources," the collaboration data 132 should reflect a moderately acceptable collaboration. In an embodiment, this may be reflected using a second set of linguistic variables such as "Highly Successful Collaboration," "Moderately Successful Collaboration," "Unsuccessful Collaboration," and the like. In another non-limiting example, of a fuzzy inference rule if a first graphical datum includes a linguistic variable representing "Weak Resources" and it is paired with a second graphical datum which includes a linguistic variable representing "Weak Resources," then the resulting collaboration data 132 may be reflected using a linguistic variable such as "Unsuccessful Collaboration." Using fuzzy inference rules like the rule mentioned herein above, we can compare the resources of a first entity and the assets/liabilities of a second entity to assess the opportunity for collaboration between two or more entities based on one or more traits of the entity. The linguistic terms used ("Strong Resources," "Moderate Resources," and "Neutral Resources") are fuzzy sets that represent imprecise concepts rather than precise numerical values. The specific membership functions for these linguistic terms would need to be defined based on the context and criteria relevant to the comparison. When applying a fuzzy inference rule, the membership degrees for the linguistic terms "Strong" and "Moderate" are determined based on the actual asset and liability values of each entity. Fuzzy logic operators like AND, OR, and NOT can be used to combine the membership degrees and evaluate the rule's activation strength. In an embodiment, the collaboration data 132 may be determined by a comparison of the degree of match between a first fuzzy set and a second fuzzy set, and/or single values therein with each other or with either set, which is sufficient for purposes of the matching process.

Still referring to FIG. 1, collaboration data 132 may be determined as a function of the intersection between two fuzzy sets, wherein each fuzzy set may be representative of a first graphical data and a second graphical data respectively. Comparing the first graphical datum and a second graphical datum may include utilizing a fuzzy set inference system as described herein below, or any scoring methods as described throughout this disclosure. For example, without limitation, processor 104 may use a fuzzy logic model to determine collaboration data 132 as a function of fuzzy set comparison techniques as described in this disclosure. In some embodiments, each piece of information associated with a first graphical datum may be compared to a second graphical datum, wherein the collaboration data 132 may be represented using a linguistic variable on a range of potential numerical values, where values for the linguistic variable may be represented as fuzzy sets on that range; a "good" or "ideal" fuzzy set may correspond to a range of values that can be characterized as ideal, while other fuzzy sets may correspond to ranges that can be characterized as mediocre, bad, or other less-than-ideal ranges and/or values. In embodiments, these variables may be used to compare a first graphical datum and a second graphical datum to determine the collaboration data 132 specific to the attributes represented within a plurality of entity profiles 108. A fuzzy inferencing system may combine such linguistic variable values according to one or more fuzzy inferencing rules, including any type of fuzzy inferencing system and/or rules as described in this disclosure, to determine a degree of membership in one or more output linguistic variables having values representing ideal overall performance, mediocre or middling overall performance, and/or low or poor overall performance; such mappings may, in turn, be "defuzzified" as described in further detail below to provide an overall output and/or assessment.

Still referring to FIG. 1, processor 104 may be configured to display collaboration data 132 using a display device 152. As used in the current disclosure, a "display device" is a device that is used to display a plurality of data and other digital content. A display device 152 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, processor 104 may be configured to display collaboration data 132 within a graphical user interface data structure. As used in the current disclosure, a "graphical user interface (GUI) data structure" refers to the organization and representation of data within a GUI framework. The GUI data structures may be configured to represent and manage collections of data. The data within the GUI data structures may be any data mentioned herein throughout the entirety of this disclosure including entity profiles 108, operational data 112, demand data 116, demand scope, free zones 120, exploitation data 124, collaboration categories 136, exploitation rankings 140, graphical data 144, first graphical datum, second graphical datum, collaboration data 132. In a non-limiting example, tables or lists may utilize arrays, linked lists, or other data structures to store and manipulate their data items. GUI data structures may provide a structured representation of the data being displayed or edited in the GUI, allowing for efficient manipulation and synchronization with the underlying data source. A GUI data structure may organize data to be organized into a hierarchical structure. This hierarchy represents the containment and nesting relationships among various components. For example, a window may contain panels, which in turn may contain buttons or text fields. This hierarchical structure allows for easy management and manipulation of the interface elements. GUI data structure may employ layout managers to determine the positioning and sizing of components within a container. Layout managers use specific data structures, such as grids, trees, or linked lists, to manage the placement and alignment of components based on layout rules or constraints.

Figure 2:
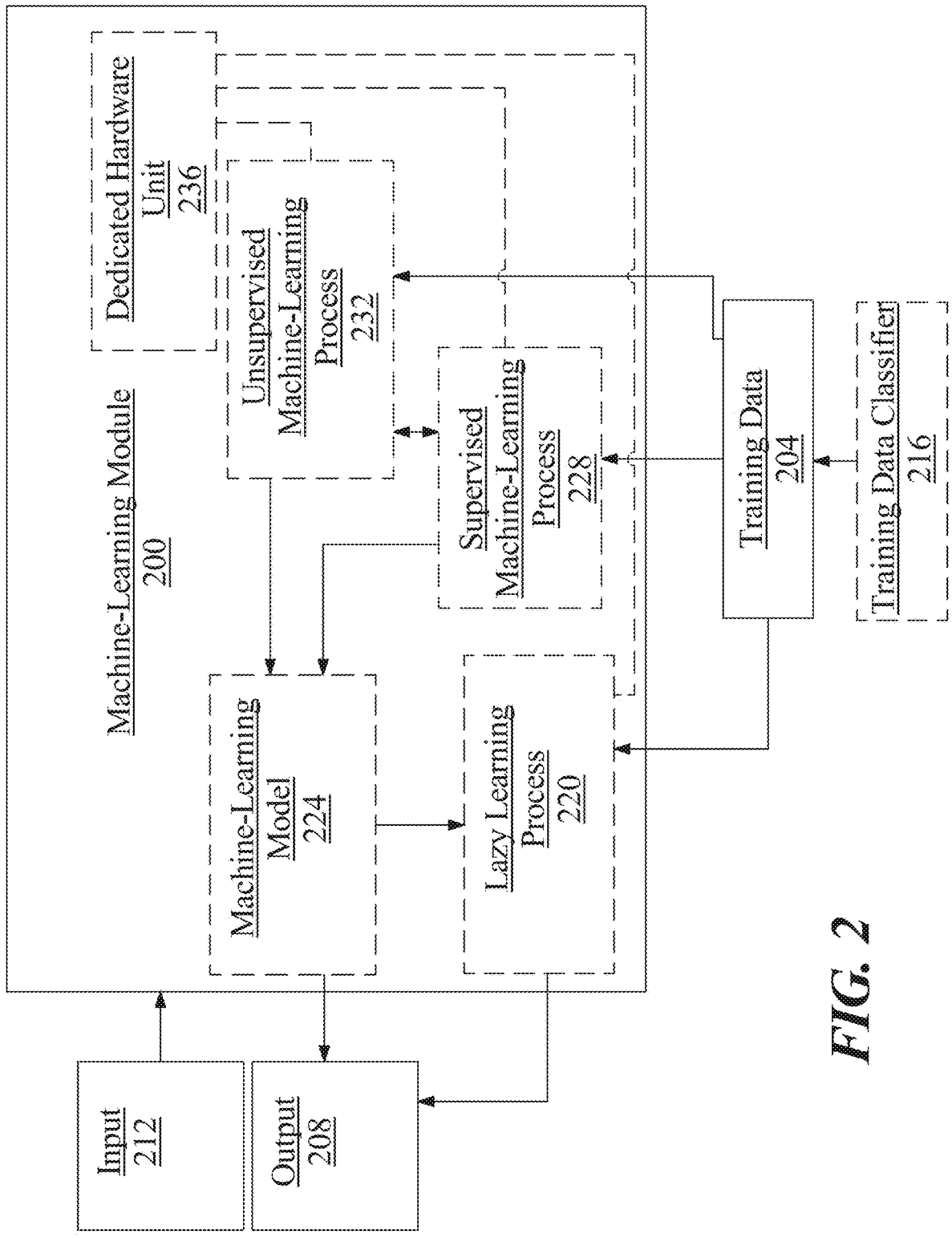
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, a plurality of free zones 120 may be used as inputs whereas a plurality of exploitation data 124 is generated as an output.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to industry of the entity or the size of the entity.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include entity profile 108, entity data, operational data 112, demand data 116, demand scope, free zones 120, examples of exploitation data 124, and the like as described above as inputs, exploitation data 124 tailored to the free zones 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
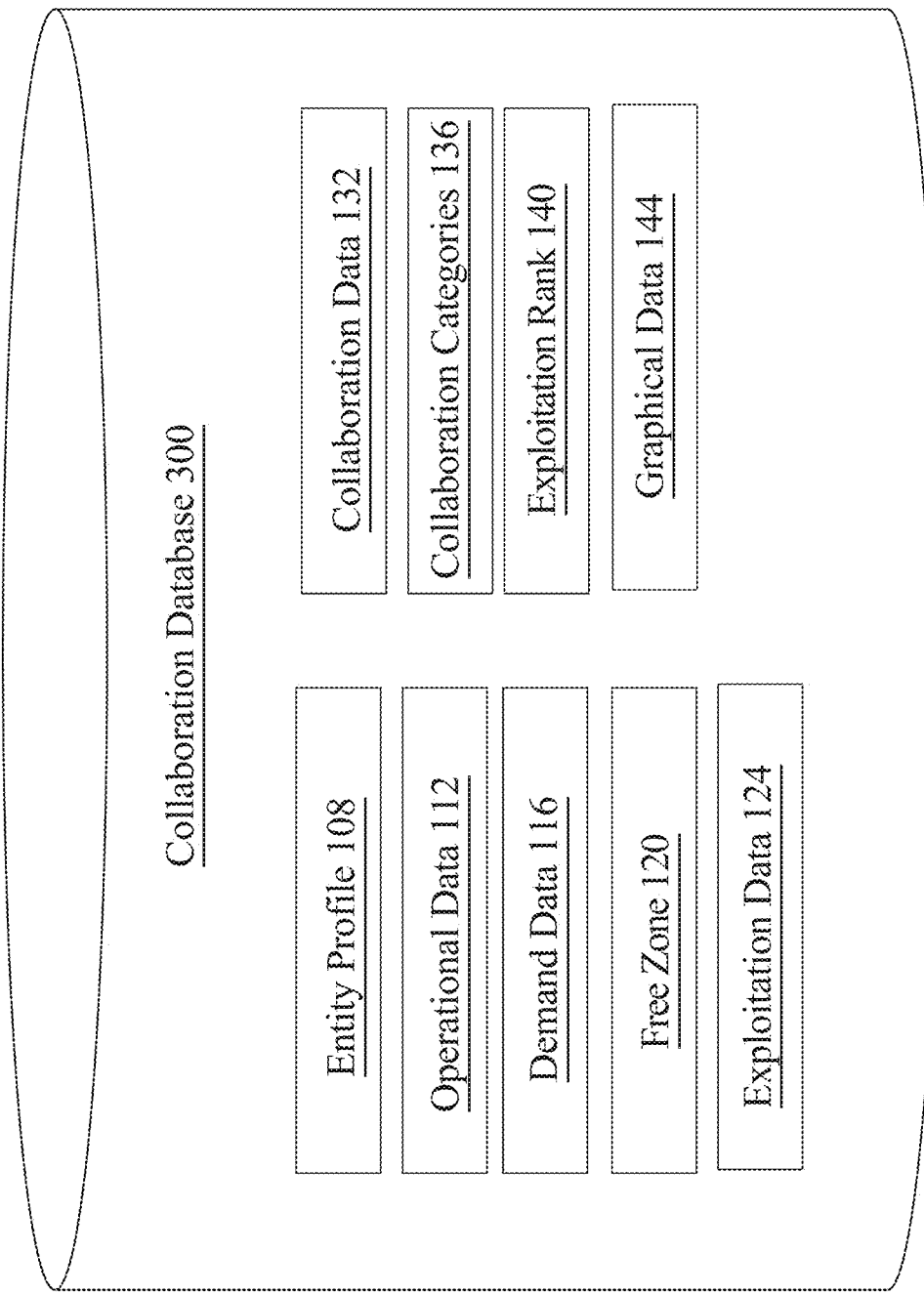
FIG. 3 is a block diagram of an exemplary embodiment of a collaboration database.

Now referring to FIG. 3, an exemplary collaboration database 300 is illustrated by way of block diagram. In an embodiment, any past or present versions of any data disclosed herein may be stored within the collaboration database 300 including but not limited to: entity profiles 108, operational data 112, demand data 116, demand scope, free zones 120, exploitation data 124, collaboration categories 136, exploitation rankings 140, graphical data 144, first graphical datum, second graphical datum, collaboration data 132. Processor 104 may be communicatively connected with collaboration database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Collaboration database 300 may be implemented, without limitation, as a relational database, a key-value retrieval database such as a NOSQL database, or any other format or structure for use as a database that a person skilled in the art would recognize as suitable upon review of the entirety of this disclosure. Collaboration database 300 may alternatively or additionally be implemented using a distributed data storage protocol and/or data structure, such as a distributed hash table or the like. Collaboration database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
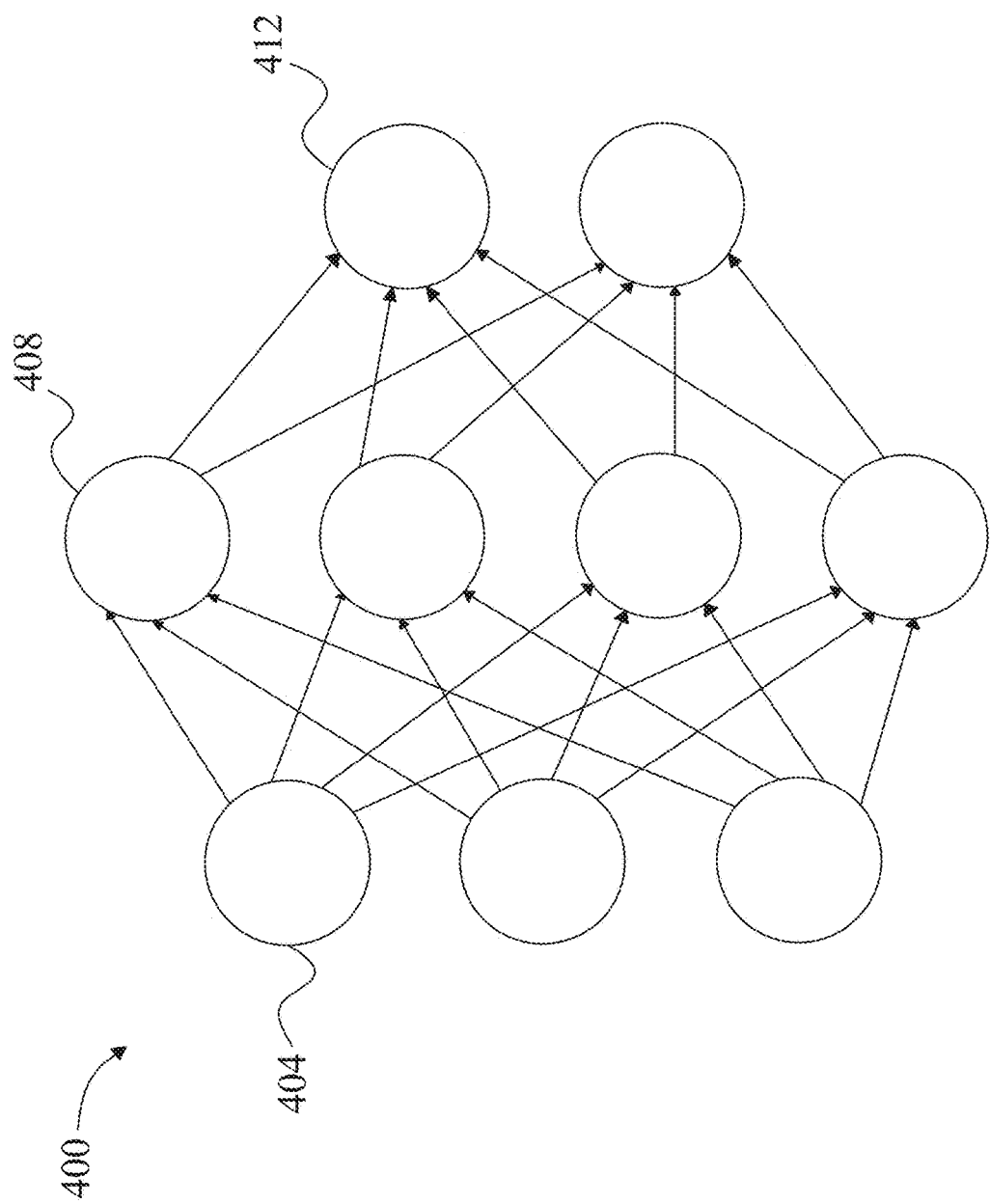
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
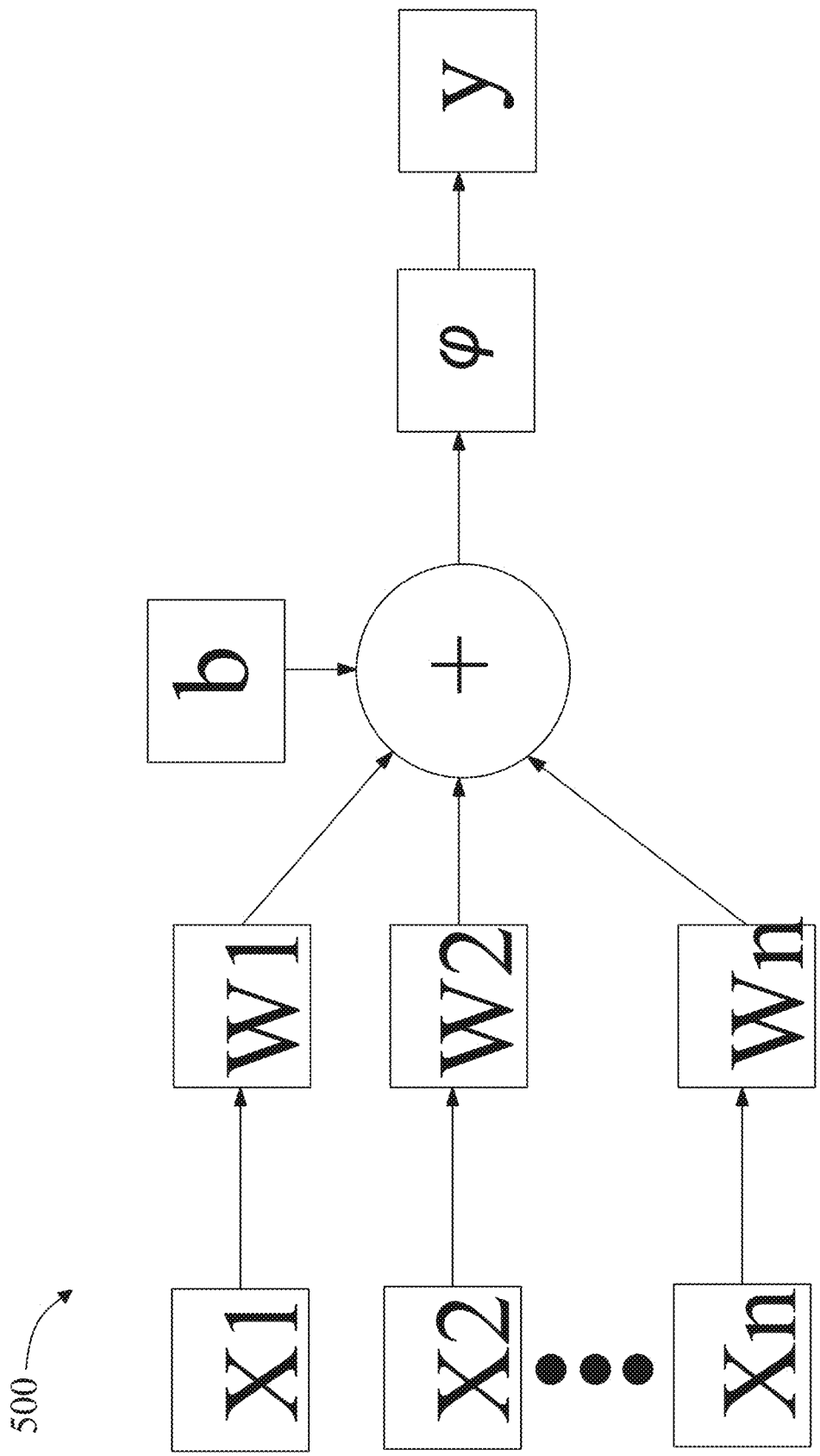
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$, applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, may be determined by training a neural network using training data, which may be performed using any suitable process as described above.

Figure 6:
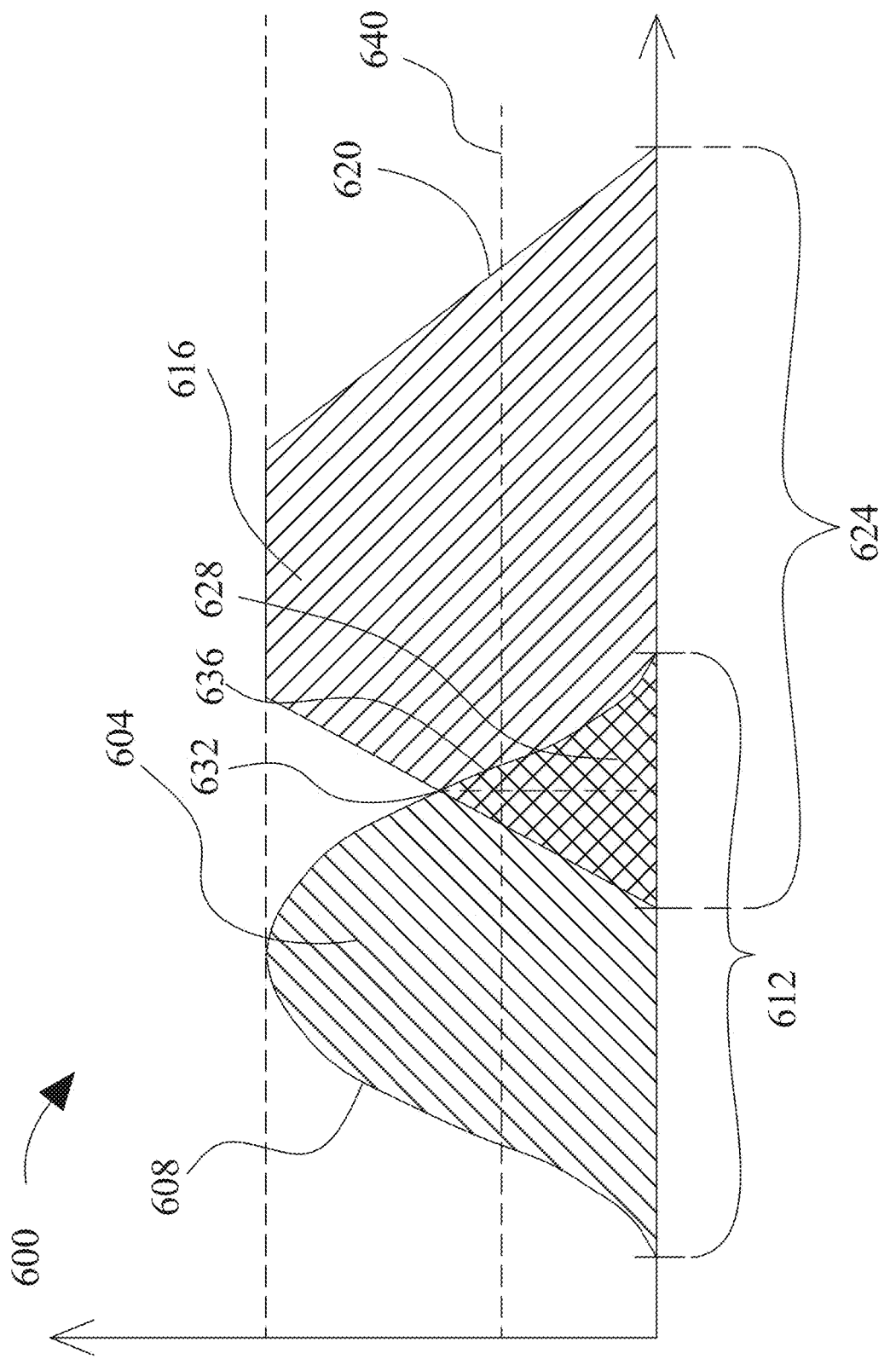
FIG. 6 is an illustration of an exemplary embodiment of a fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a first graphical datum and a second graphical datum from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a first graphical datum and a second graphical datum. For instance, an acceptance variable may represent a first measurable value pertaining to the comparison of a first graphical datum and a second graphical datum. Continuing the example, an output variable may represent a collaboration data 132. In an embodiment, a first graphical datum and a second graphical datum may be represented by their own fuzzy set. In other embodiments, collaboration data 132 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a first graphical datum and a second graphical datum. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, collaboration data 132 may indicate a sufficient degree of overlap with fuzzy set representing an a first graphical datum and a second graphical datum for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a first graphical datum and a second graphical datum have fuzzy sets, collaboration data 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
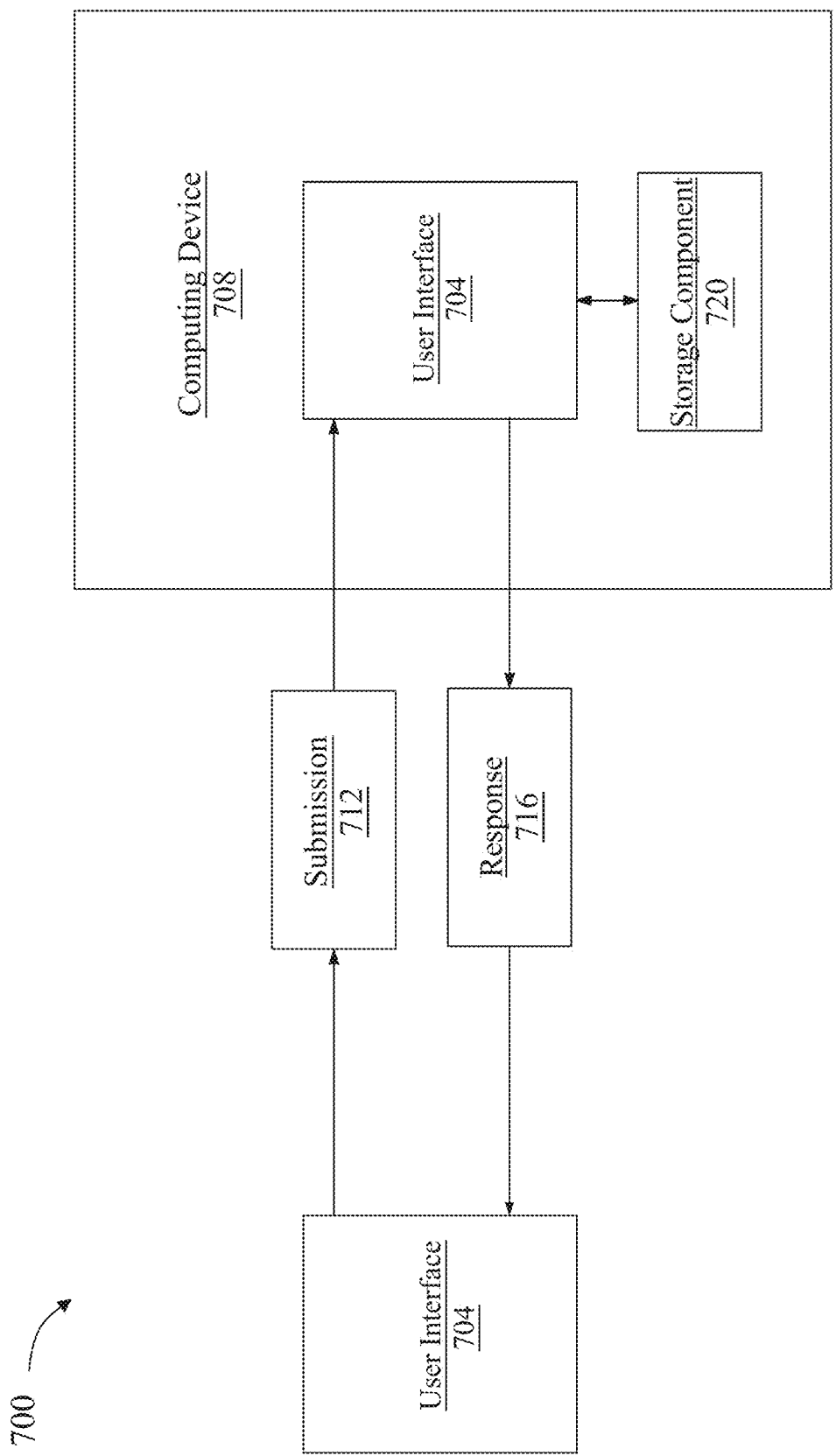
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "Chatbot input" is any response that a candidate or employer inputs into a chatbot as a response to a prompt or question.

With continuing reference to FIG. 7, computing device 708 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational identification may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
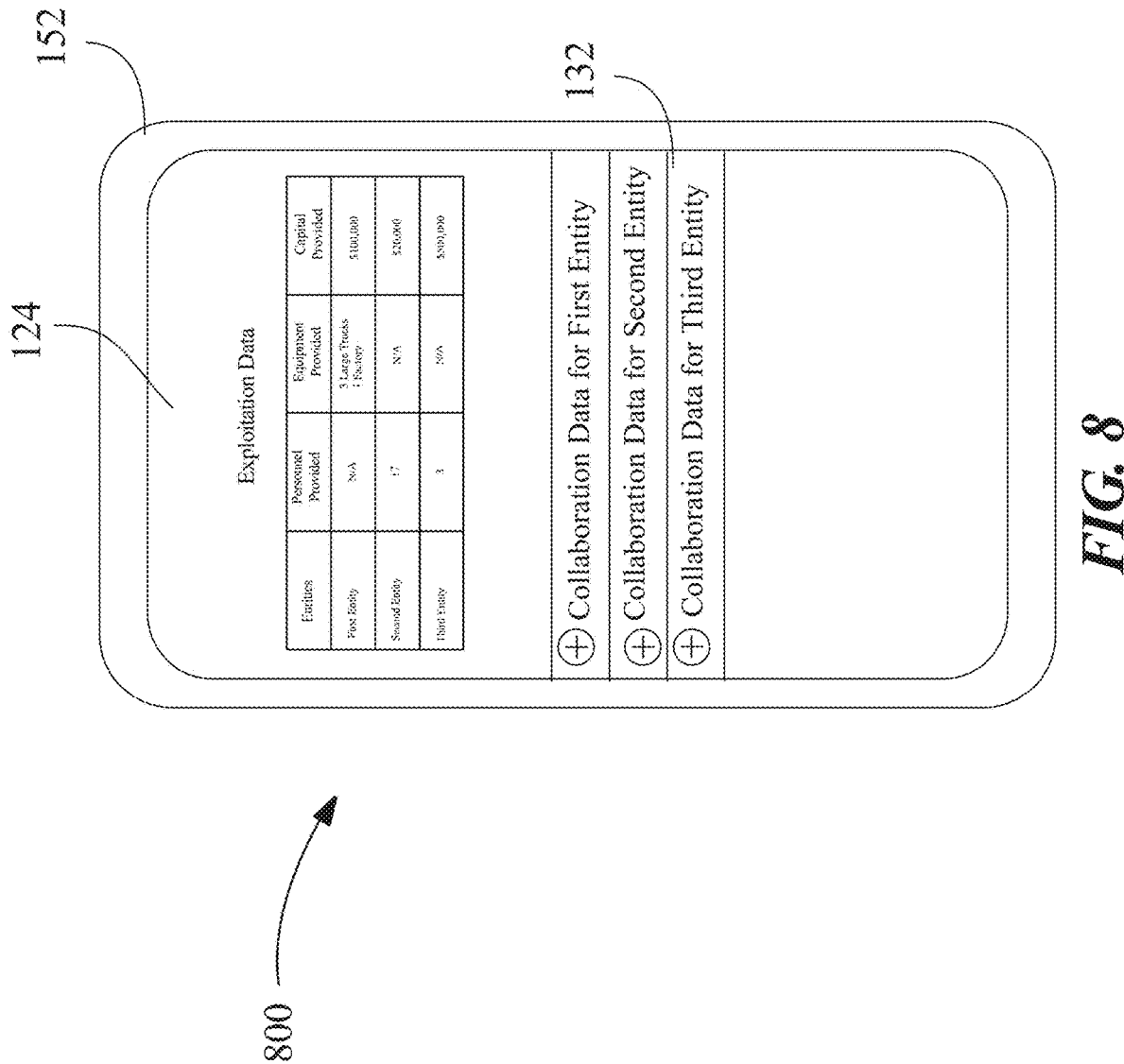
FIG. 8 is an exemplary embodiment of a user interface.

Now referring to FIG. 8, an exemplary representation of a user interface component is presented. User interface 800 may include a display device such as display device 1448. In an embodiment, user interface 800 may display collaboration data 132. This may provide the user with an indication of the free zone 120 to be capitalized and what is required from the user to capitalize said free zone. In some embodiments, user interface 800 may allow the entities to opt into the collaboration with an entity based on the information provided from the collaboration data 132 using a digital signature. This signature may be used as a mechanism to signify the mutual assent of both parties to the consideration components of the collaboration. The digital signature may also be used to allow both parties to acknowledge the receipt of the collaboration data 132. In some embodiments, user interface 800 may display a plurality of questions that require the user to enter information regarding the entity profile 108 and operational data 112, wherein the user is able to enter information regarding themselves or their entity. This may be done using the chatbot system of FIG. 7, which may be implemented using user interface 800.

Figure 9:
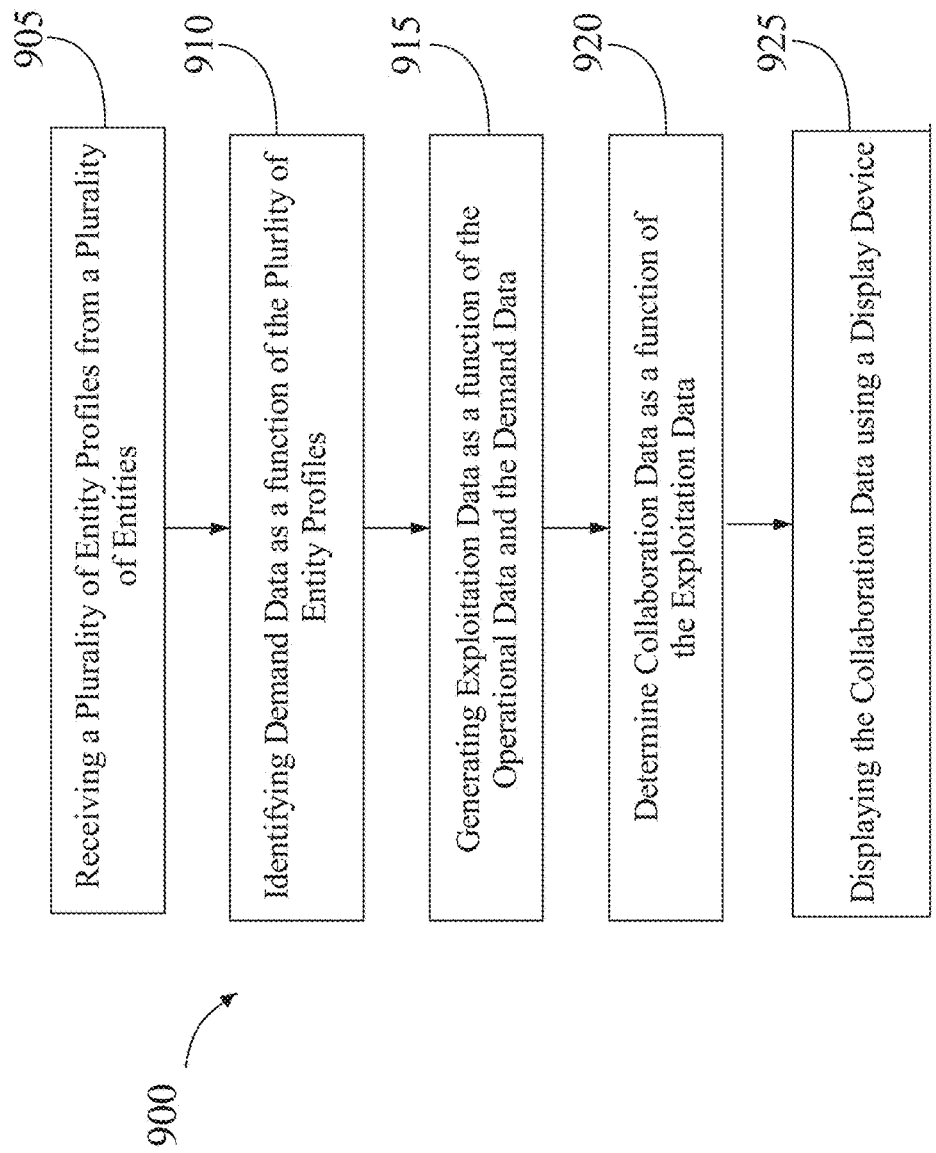
FIG. 9 is a flow diagram of an exemplary method for the generation of exploitation data.

Referring now to FIG. 9, a flow diagram of an exemplary method 900 for the generation of a collaboration score is illustrated. At step 905, method 900 includes receiving, using at least a processor, a plurality of entity profiles from a plurality of entities, wherein each of the plurality of entity profiles comprises a plurality of operational data, wherein the plurality of entity profiles additionally comprises a first entity profile and a second entity profile. This may be implemented as described and with reference to FIGS. 1-9. In some embodiments, extracting the entity profile may comprise extracting the entity profile using a WebCrawler or a chatbot. In other embodiments, the plurality of operational data may include a plurality of operational capabilities.

Still referring to FIG. 9, At step 910, method 900 includes identifying, using the at least a processor, demand data as a function of the plurality of entity profiles. This may be implemented as described and with reference to FIGS. 1-9. In an embodiment, the demand data may include one or more free zones. Free zones may include an identification of a target group. In other embodiments, the method may further include identifying, using the at least a processor, the demand data using a webcrawler.

Still referring to FIG. 9, At step 915, method 900 includes generating, using the at least a processor, exploitation data as a function of the operational data and the demand data. This may be implemented as described and with reference to FIGS. 1-9. In an embodiment, generating the exploitation data may include generating the exploitation data using an exploitation machine-learning model. In some cases, generating the exploitation data using the exploitation machine-learning model may include training the exploitation machine-learning model using exploitation training data, wherein the exploitation training data contains a plurality of data entries containing the operational data inputs correlated to the exploitation data as an output and generating the exploitation data as a function of the operational data and the demand data using a trained exploitation machine-learning model.

Still referring to FIG. 9, At step 920, method 900 includes determining, using the at least a processor, collaboration data as a function of the exploitation data. Determining the collaboration data includes classifying the plurality of operational data into a plurality of collaboration categories. Determining the collaboration data includes determining an exploitation rank as a function of the classification of the plurality of operational data into the plurality of collaboration categories. Determining the collaboration data includes plotting a plurality graphical data as a function of the exploitation rank. Determining the collaboration data includes determining the collaboration data as a function of a comparison of the first graphical datum and the second graphical datum. This may be implemented as described and with reference to FIGS. 1-9. In some embodiments, the method may further include determining, using the at least a processor, the collaboration data comprises a comparison of the first graphical datum and the second graphical datum using a fuzzy inference set. In other embodiments, the method may further include determining, using the at least a processor, the exploitation rank as a function of an attribute quantifier. In some cases, plotting the plurality graphical data may include plotting the exploitation rank along a continuum.

Still referring to FIG. 9, At step 925, method 900 includes displaying the collaboration data using a display device. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
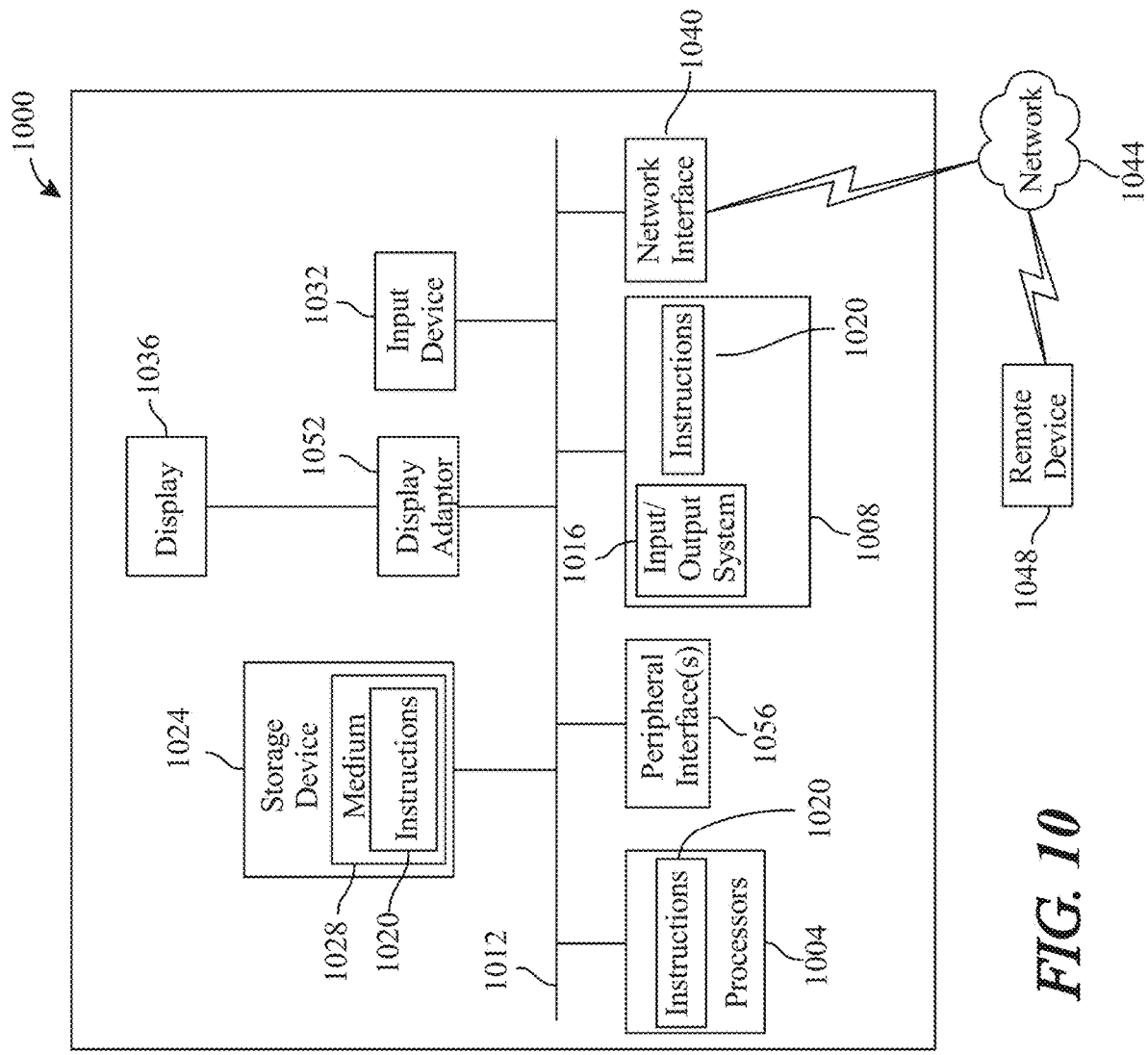
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the generation of exploitation data, wherein the apparatus comprises:
   at least a processor; and
   a memory communicatively connected to the at least a processor, wherein the memory comprising instructions configuring the at least a processor to:
   receive a plurality of entity profiles from a plurality of entities, wherein each of the plurality of entity profiles comprises a plurality of operational data, wherein the plurality of entity profiles additionally comprises a first entity profile and a second entity profile;
   identify demand data as a function of the plurality of entity profiles;
   generate, using a trained exploitation machine-learning model, exploitation data as a function of the operational data and the demand data, wherein the trained exploitation machine-learning model is trained using exploitation training data, wherein the exploitation training data contains a plurality of data entries containing operational data inputs correlated to exploitation data outputs;
   determine collaboration data as a function of the exploitation data, wherein determining the collaboration data comprises:
   classifying the plurality of operational data into a plurality of collaboration categories;
   determining an exploitation rank as a function of the exploitation data and the classification of the plurality of operational data into the plurality of collaboration categories;
   plotting a plurality of graphical data as a function of the exploitation rank, wherein the plurality of graphical data comprises:
   a first graphical datum associated with the first entity profile; and
   a second graphical datum associated with the second entity profile;
   determining the collaboration data as a function of a comparison of the first graphical datum and the second graphical datum; and
   display the collaboration data using a display device.

2. The apparatus of claim 1, wherein the demand data is indicative of one or more free zones where demand has not been addressed.

3. The apparatus of claim 2, wherein the one or more free zones comprises an identification of a target group.

4. The apparatus of claim 1, wherein identifying the demand data comprises identifying demand data using a web crawler.

5. The apparatus of claim 1, wherein determining the collaboration data comprises a comparison of the first graphical datum and the second graphical datum using a fuzzy inference set.

6. The apparatus of claim 1, wherein the memory further instructs the processor to identify a plurality of operational capabilities as a function of the plurality of operational data.

7. The apparatus of claim 1, wherein the memory further instructs the processor to generate an attribute quantifier as a function of the plurality of collaboration categories, wherein the attribute quantifier is configured to assign an importance value to each collaboration category of the plurality of collaboration categories.

8. The apparatus of claim 1, wherein plotting the plurality graphical data comprises plotting the exploitation rank along a continuum.

9. A method for the generation of exploitation data, wherein the method comprises:
   receiving, using at least a processor, a plurality of entity profiles from a plurality of entities, wherein each of the plurality of entity profiles comprises a plurality of operational data, wherein the plurality of entity profiles additionally comprises a first entity profile and a second entity profile;
   identifying, using the at least a processor, demand data as a function of the plurality of entity profiles;
   generating, using a trained exploitation machine-learning model, exploitation data as a function of the operational data and the demand data, wherein the trained exploitation machine-learning model is trained using exploitation training data, wherein the exploitation training data contains a plurality of data entries containing operational data inputs correlated to exploitation data outputs;

determining, using the at least a processor, collaboration data as a function of the exploitation data, wherein determining the collaboration data comprises:
  classifying the plurality of operational data into a plurality of collaboration categories;
  determining an exploitation rank as a function of the exploitation data and the classification of the plurality of operational data into the plurality of collaboration categories;
  plotting a plurality graphical data as a function of the exploitation rank, wherein the plurality of graphical data comprises:
    a second graphical datum associated with the second entity profile;
    a first graphical datum associated with the first entity profile; and
  determining the collaboration data as a function of a comparison of the first graphical datum and the second graphical datum; and
displaying the collaboration data using a display device.

10. The method of claim 9, wherein the demand data is indicative of one or more free zones where demand has not been addressed.

11. The method of claim 10, wherein the one or more free zones comprises an identification of a target group.

12. The method of claim 9, wherein the method further comprises identifying, using the at least a processor, the demand data using a web crawler.

13. The method of claim 9, wherein the method further comprises determining, using the at least a processor, the collaboration data comprises a comparison of the first graphical datum and the second graphical datum using a fuzzy inference set.

14. The method of claim 9, wherein the method further comprises identifying, using the at least a processor, a plurality of operational capabilities as a function of the plurality of operational data.

15. The method of claim 9, wherein the method further comprises generating, using the at least a processor, an attribute quantifier as a function of the plurality of collaboration categories, wherein the attribute quantifier is configured to an importance value to each collaboration category of the plurality of collaboration categories.

16. The method of claim 9, wherein plotting the plurality graphical data comprises plotting the exploitation rank along a continuum.

* * * * *